United States Patent
Cheesewright et al.

(10) Patent No.: US 7,240,567 B2
(45) Date of Patent: Jul. 10, 2007

(54) DYNAMIC RESPONSE CHARACTERISTICS OF FLOW METERS

(75) Inventors: Robert Cheesewright, High Wycombe (GB); Colin Clark, Great Haseley (GB)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 10/976,312

(22) Filed: Oct. 29, 2004

(65) Prior Publication Data
US 2005/0109123 A1    May 26, 2005

Related U.S. Application Data

(60) Provisional application No. 60/515,424, filed on Oct. 30, 2003.

(51) Int. Cl.
*G01F 1/84* (2006.01)
(52) U.S. Cl. .................................. 73/861.355
(58) Field of Classification Search .......... 73/861.355, 73/861.356, 861.357, 861.28
See application file for complete search history.

(56) References Cited

U.S. PATENT DOCUMENTS

| | | | |
|---|---|---|---|
| 4,760,739 A * | 8/1988 | Ichino | .......................... 73/661 |
| 5,827,979 A | 10/1998 | Schott et al. | |
| 5,975,747 A | 11/1999 | Flaherty | |
| 5,996,650 A | 12/1999 | Phallen et al. | |
| 6,092,429 A | 7/2000 | Cunningham et al. | |
| 6,173,214 B1 | 1/2001 | Neelay et al. | |
| 6,507,791 B2 * | 1/2003 | Henry et al. | .................. 702/45 |
| 6,758,102 B2 * | 7/2004 | Henry et al. | ........... 73/861.356 |
| 6,769,301 B2 * | 8/2004 | Barger et al. | .......... 73/861.356 |

OTHER PUBLICATIONS

Behhadj, A., et al., "The Simulation of Coriolis Meter Response to Pulsating Flow Using a General Purpose F.E. Code," *Journal of Fluids and Structures* (2000), vol. 14, pp. 613-634.
Cheesewright, Robert, et al. "Effect of Mechanical Vibrations on Coriolis Mass Flow Meters," *Journal of Dynamic Systems, Measurement and Control* (Mar. 2003), vol. 125, pp. 103-113.
Cheesewright, R., et al. "The Dynamic Response of Coriolis Massflow Meters," *Proceedings of FLUCOME'2000*, Sherbrook, Canada, Aug. 2000, 6 pgs.
Cheesewright, R., et al. "The Effect of Flow Pulsations on Coriolis Mass Flow Meters," *Journal of Fluids and Structures* (1998), vol. 12, pp. 1025-1039.

(Continued)

*Primary Examiner*—Jewel Thompson
(74) *Attorney, Agent, or Firm*—Fish & Richardson P.C.

(57) ABSTRACT

A flowmeter includes a vibratable flowtube that has internal damping characteristics that substantially result in a desired dynamic response of the vibratable tube to a change in a flow of fluid through the vibratable flowtube. The dynamic response may be to a change in a property of the flow of fluid, a step change in the flow, and/or a change in the mass flow rate. The vibratable flowtube may have frequency-dependent internal damping characteristics such that damping of a driven mode of vibration is not substantially increased and damping at one or more modes other than the driven mode are substantially increased.

21 Claims, 9 Drawing Sheets

OTHER PUBLICATIONS

Cheesewright, R., et al. "Understanding the Experimental Response of Coriolis Massflow Meters to Flow Pulsation," *Flow Measurement and Instrumentation* (1999), vol. 10, pp. 207-215.

Clark, C., et al. "The Influence Upon Coriolis Mass Flow Meters of External Vibrations at Selected Frequencies," *Flow Measurement and Instrumentation* (2003), vol. 14, pp. 33-42.

Clough, Ray, et al. *Dynamics of Structures* Chapter 17, Section 5, pp. 301 and 302, 1975.

Cunningham, T.J., et al. "Zero Shifts in Coriolis Sensors Due to Imbalance," *AIAA Technical Paper,* AIAA-94-1621-CP, pp. 2409-2418.

Hulbert, G.M., et al., "Numerical and Experimental Analysis of Coriolis Mass Flowmeters," *AIAA Technical Paper,* AIAA-95-1384-CP, pp. 1889-1893.

Païdoussis, M.P., et al. "Dynamic Stability of Pipes Conveying Fluid," *Journal of Sound and Vibration* (1974), vol. 33, No. 3, pp. 267-294.

Raszillier, H., et al. "Coriolis-Effect in Mass Flow Metering," *Archive of Applied Mechanics* (1991), vol. 61, pp. 192-214.

Raszillier, H., et al. "Mode Mixing in Coriolis Flowmeters," *Archive of Applied Mechanics* (1993), vol. 63, pp. 219-227.

Stack, C.P., et al. "A Finite Element for the Vibration Analysis of a Fluid-Conveying Timoshenko Beam," *AIAA Technical Paper, 34th AIAA/ASME/ASCE/AHS/ASC Structures, Structural Dynamics and Materials Conference, AIAA/ASME Adaptive Structures Forum,* Apr. 19-22, 1993, La Jolla, California, AIAA-93-1552-CP, pp. 2120-2129.

Wiklund, David, et al. "Quantifying and Specifying the Dynamic Response of Flowmeters," *ISA 2002 Technology Update, Proceedings of ISA2002 Technical Conference,* Oct. 21-23, 2002, Chicago, Illinois, vol. 422, pp. 463-475.

* cited by examiner

| | | |
|---|---|---|
| a accelerometer | b by-pass | c Coriolis test meter |
| d burstable diaphragm | m electromagnetic flowmeter | o variable area orifice |
| p pressure gauge | pt pressure transducer | pu pump |
| rm reference flowmeter | s sump | w weigh-tank |

DYNAMIC RESPONSE CHARACTERISTICS OF FLOW METERS

CROSS-REFERENCE TO RELATED APPLICATIONS

This application claims priority to U.S. application Ser. No. 60/515,424, filed on Oct. 30, 2003, and titled DYNAMIC RESPONSE CHARACTERISTICS OF MASS FLOW METERS, which is hereby incorporated by reference.

TECHNICAL FIELD

This invention relates to flowmeters.

BACKGROUND

Flowmeters provide information about materials being transferred through a conduit. For example, mass flowmeters provide a direct measurement of the mass of material being transferred through a conduit. Similarly, density flowmeters, or densitometers, provide a measurement of the density of material flowing through a conduit. Mass flowmeters also may provide a measurement of the density of the material.

For example, Coriolis-type mass flowmeters are based on the Coriolis effect, in which material flowing through a rotating conduit becomes a radially-travelling mass that is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

SUMMARY

In one aspect, a method of producing a flowmeter is described. The method includes providing a vibratable flowtube having internal damping characteristics that substantially result in a desired dynamic response of the vibratable flowtube; connecting at least one driver to the provided vibratable flowtube such that the driver is operable to impart motion to the flowtube; connecting at least one sensor to the provided vibratable flowtube such that the sensor is operable to sense the motion of the flowtube and generate a sensor signal; and connecting at least one controller to the sensor such that the controller is operable to receive the sensor signal.

In another aspect, a flowmeter is described. The flowmeter includes a vibratable flowtube. The vibratable flowtube has internal damping characteristics that substantially result in a desired dynamic response of the vibratable tube. At least one driver is connected to the flowtube and operable to impart motion to the flowtube. At least one sensor is connected to the flowtube and operable to sense the motion of the flowtube and generate a sensor signal. At least one controller is configured to receive the sensor signal.

Implementations may include one or more of the following features. For example, the flowmeter may be a Coriolis flowmeter.

The vibratable flowtube may have different internal damping characteristics at different points along a length of the vibratable flowtube such that damping of a driven mode of vibration is not substantially increased and damping at one or more modes other than the driven mode are substantially increased. A high damping material may be applied to the vibratable flowtube at the different points along the length of the tube to provide the different internal damping characteristics. The vibratable flowtube may be made of a composite material that has frequency-dependent damping such that damping of a driven mode of vibration is not substantially increased and damping at one or more modes other than the driven mode are substantially increased.

The desired dynamic response may be a dynamic response of the vibratable flowtube to change in a property of the flow of fluid, a change in a mass flow rate of a flow of fluid, and/or to a step change in a flow of fluid through the vibratable flowtube.

The details of one or more implementations are set forth in the accompanying drawings and the description below. Other features will be apparent from the description and drawings, and from the claims.

DETAILED DESCRIPTION

Types of flowmeters include digital flowmeters. For example, U.S. Pat. No 6,311,136, discloses the use of a digital flowmeter and related technology. Such digital flowmeters may be very precise in their measurements, with little or negligible noise, and may be capable of enabling a wide range of positive and negative gains at the driver circuitry for driving the conduit. Such digital flowmeters are thus advantageous in a variety of settings. For example, U.S. Pat. No. 6,505,519 discloses the use of a wide gain range, and/or the use of negative gain, to prevent stalling and to more accurately exercise control of the flowtube, even during difficult conditions such as two-phase flow.

Although digital flowmeters are specifically discussed below with respect to FIGS. 1 and 2, it should be understood that analog flowmeters also exist. Although such analog flowmeters may be prone to typical shortcomings of analog circuitry, e.g., low precision and high noise measurements relative to digital flowmeters, they also may be compatible with the various techniques and implementations discussed herein. Thus, in the following discussion, the term "flowmeter" or "meter" is used to refer to any type of device and/or system in which a Coriolis flowmeter system uses various control systems and related elements to measure a mass flow, density, and/or other parameters of a material(s) moving through a flowtube or other conduit.

Figure 1A:
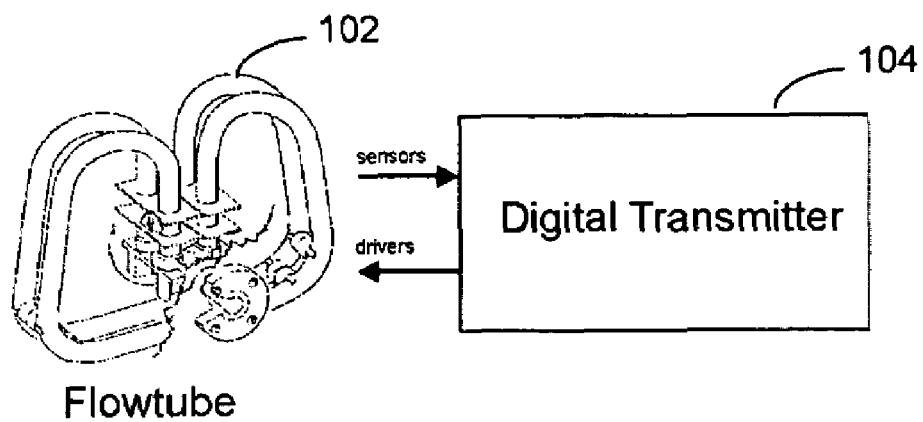
FIG. 1A is an illustration of a Coriolis flowmeter using a bent flowtube.

FIG. 1A is an illustration of a digital flowmeter using a bent flowtube 102. Specifically, the bent flowtube 102 may be used to measure one or more physical characteristics of, for example, a (traveling) fluid, as referred to above. A detailed description of a structure and operation(s) of the bent flowtube 102 is provided in, for example, commonly-assigned U.S. Pat. No. 6,311,136. Flowtubes which are similar in concept to the bent flowtube 102 are also discussed in, for example, U.S. Pat. No. 6,327,914 B1, which is incorporated by reference in its entirety.

In FIG. 1A, a digital transmitter (controller) 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102.

Figure 1B:
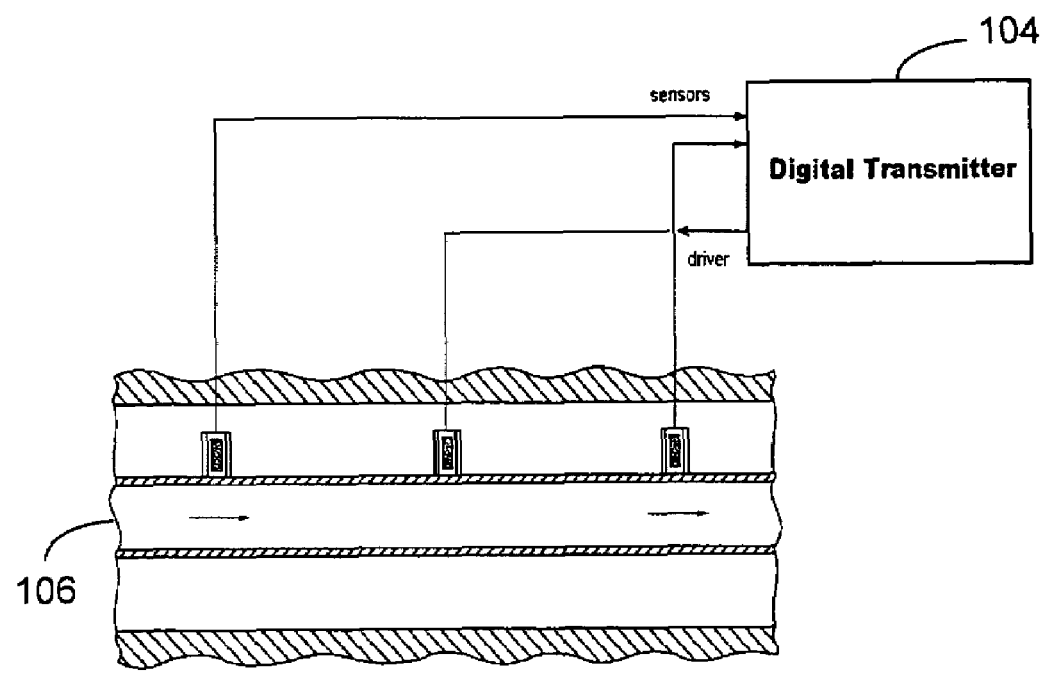
FIG. 1B is an illustration of a Coriolis flowmeter using a straight flowtube.

FIG. 1B is an illustration of a digital flowmeter using a straight flowtube 106. More specifically, in FIG. 1B, the straight flowtube 106 interacts with the digital transmitter 104. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50–110 Hz, while the straight flowtube 106 may operate at a frequency of, for example, 300–1,000 Hz.

Figure 1C:
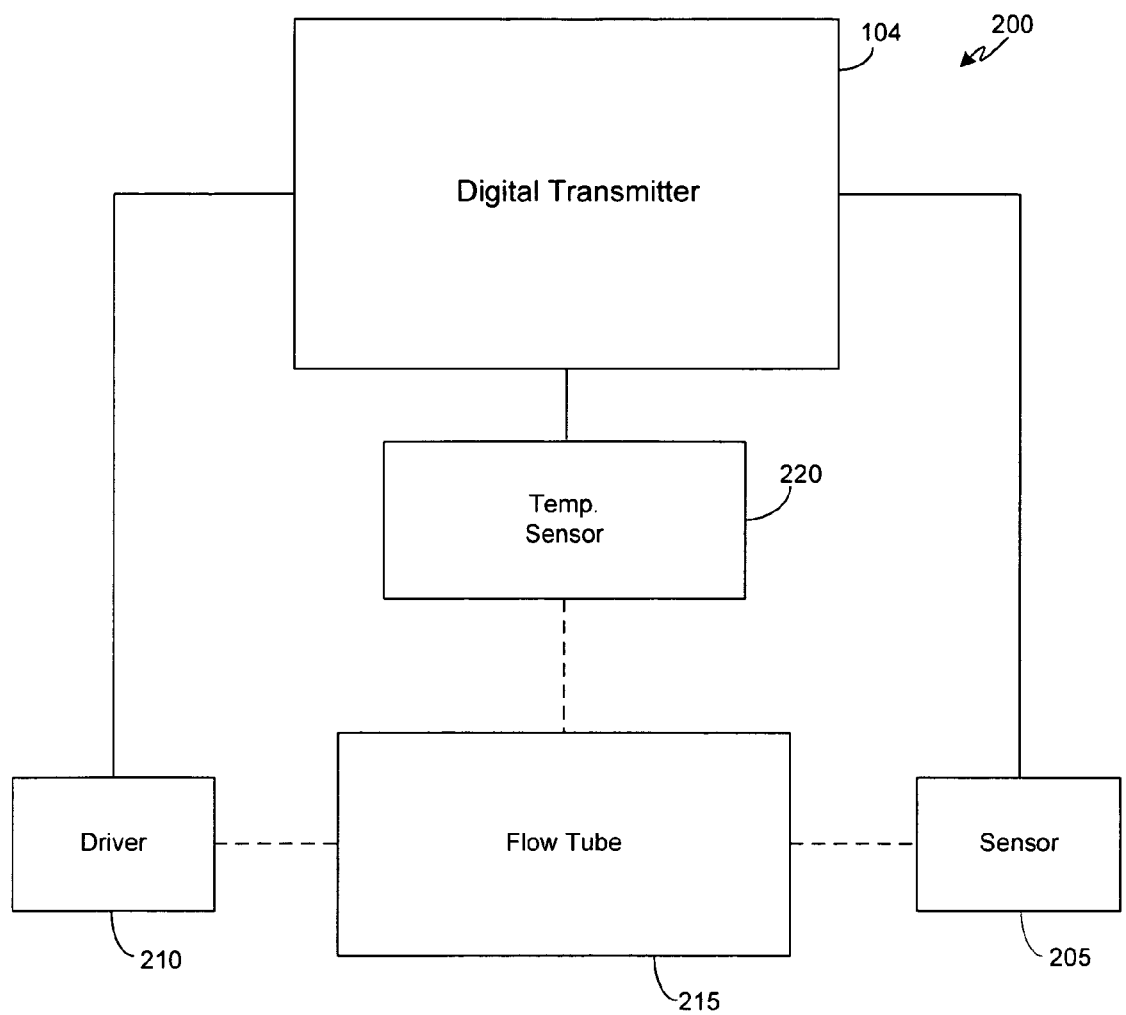
FIG. 1C is a block diagram of a Coriolis flowmeter.

Referring to FIG. 1C, a digital mass flowmeter 200 includes the digital transmitter 104, one or more motion sensors 205, one or more drivers 210, a flowtube 215 (which also may be referred to as a conduit, and which may represent either the bent flowtube 102, the straight flowtube 106, or some other type of flowtube), and a temperature sensor 220. The digital transmitter 104 may be implemented using one or more of, for example, a processor, a Digital Signal Processor (DSP), a field-programmable gate array (FPGA), an ASIC, other programmable logic or gate arrays, or programmable logic with a processor core.

The digital transmitter 104 generates a measurement of, for example, density and/or mass flow of a material flowing through the flowtube 215, based at least on signals received from the motion sensors 205. The digital sensors 104 also controls the drivers 210 to induce motion in the flowtube 215. This motion is sensed by the motion sensors 205.

Density measurements of the material flowing through the flowtube are related to, for example, the frequency of the motion of the flowtube 215 that is induced in the flowtube 215 by a driving force supplied by the drivers 210, and/or to the temperature of the flowtube 215. Similarly, mass flow through the flowtube 215 is related to the phase and frequency of the motion of the flowtube 215, as well as to the temperature of the flowtube 215.

The temperature in the flowtube 215, which is measured using the temperature sensor 220, affects certain properties of the flowtube, such as its stiffness and dimensions. The digital sensors 104 may compensate for these temperature effects. Although not shown in FIG. 1C, similar comments and considerations may be applied with respect to a pressure sensor that is operable to sense a pressure of a material flowing through the flowtube 215.

In many applications, flow meters are used to determine mean flow rate only, with a time-constant set by the user. It is also useful to have flow rate measurements in flows which are required to change rapidly with time. This includes short duration batch-flows; for example, delivery of liquid pharmaceuticals into ampoules or perfume into bottles, with batching times less than 1 s. For these measurements, mass flow meters with a high performance dynamic response are useful. A meter with this capability is useful in various areas of application, for example, measurement of fuel flow to gas turbine engines, where control loop response times of 20 ms may be required.

The speed of response of commercial Coriolis meters to a step change in mass flow rate corresponds to a time constant which may range from 0.1 s to several seconds. This response is a result both of the dynamic response of the physical components of the meter and of the electronics and the computational algorithms used to convert that dynamic response into an estimate of the mass flow rate. An investigation of the dynamic response is presented with a view to investigating the overall meter response. In one example, a simple straight tube meter and analytical solutions are presented for the response to a step change in flow rate both for an undamped meter and for a meter with internal damping. These results are compared with results from a finite element model of the same meter, and then the finite element modelling is extended to geometries typical of commercial meters. Finally, representative results are presented from an experimental study of the response of commercial meters to step changes in flow rate.

A study of components of the algorithm used in a meter leads to the conclusion that the time constant is generally not less than the period of one cycle of the meter drive. The analytical, finite element and experimental results all combine to show that at least some of the meters respond in the period of one drive cycle, but that the flow step induces fluctuations in the meter output which decay under the influence of the flow tube damping. It is the additional damping introduced in the signal processing to overcome these fluctuations which appears to be responsible for the large observed time constants. Techniques for improving a dynamic meter response characteristics in this context are discussed.

The dynamic response of measuring instruments is commonly expressed in terms of a 'time constant' which indicates the time it takes for the instrument to respond to a small step change in the quantity being measured. Even at pulsation frequencies as low as 5 Hz, there may be a large error in the measured pulsation amplitude. There also may be a significant delay following the initiation of a time dependence in the flow before the output signal from the meter shows any change. Frequency response tests on a range of different flow meters including a Coriolis meter show that results may be expressed in the form of transfer functions and the Coriolis meter may be described as being characterized by a critically damped second order lag with a fixed natural frequency and damping ratio, together with a first order lag and a dead time both of which may vary with the user selectable damping. Dead times in the range 30 to 400 ms may be associated with a natural frequency of 2.39 rad/s and a damping ratio of 1.0. These values suggest that an attempt to represent the meter response in terms of a single time constant would lead to a value of the order of 1 second.

The effects of sinusoidal flow pulsations (at frequencies of the order of the meter drive frequency) in degrading the accuracy with which a simple, straight tube, Coriolis meter can measure a mean flow rate have been investigated analytically. Results were confirmed by Finite Element analyses, both for the simple straight tube meter and for a range of commercially available meters having different geometries. These results were in close accord with the results of experiments on the same meters.

In general, the degradation of meter accuracy occurred at least partly because of the generation of additional components in the sensor signals, caused by the flow pulsations. It was further demonstrated that the degree of error depends on the details of the methods used to determine the phase difference between the sensor signals and suggestions were made regarding methods by which the error in the indicated mean flow rate could be reduced. No consideration was, however, given to the question of the extent to which useful information about the time dependence of the flow rate could be recovered from the additional components in the sensor signals.

There are many factors which could influence the overall dynamic response of a Coriolis meter, ranging from the mechanics of the motion of the meter tube to the electronics (signal processing) used to determine the phase difference between the sensor signals and possibly even to the electronics of the feedback system used to maintain the meter drive. The signal processing may be the most important factor, with the user selectable damping having a major influence. Some degree of time delay in the meter output reflecting changes in the flow may occur because the shortest period over which an estimate of the phase difference can be made is one complete cycle of the meter drive. Thus, if an estimate is associated with the mid point of the period over which it is taken then there will generally be a delay of at least half the period of a drive cycle. A Coriolis meter with a drive frequency of at least 100 Hz may suggest a minimum delay of the order of 5 ms.

The signal processing may have a meaningful influence on the overall response. However, in consideration of what is potentially possible in respect of the dynamic response, a motion of the meter tube relative to the period of one half of a drive cycle provides a noticeable limitation. Thus, attention is concentrated on that factor herein. Analytical treatment below uses a model based on a simple straight tube meter, rigidly fixed at the two ends and driven at its lowest natural frequency.

Without internal damping, a transverse vibratory motion of the pipe and the fluid is represented by writing the displacement, u, as a function of the distance, x, along the pipe from one end, and of the time, t. Writing force=mass ×acceleration for the fluid and recognizing that since u=u (x,t), du/dt=(∂u/∂t)+(∂u/∂x)(dx/dt)=(∂u/∂t)+V(t)(∂u/∂x), the motion of the fluid is described by $$m_f \frac{\partial^2 u}{\partial t^2} + 2m_f V \frac{\partial^2 u}{\partial x \partial t} + m_f \frac{dV}{dt} \frac{\partial u}{\partial x} + m_f V^2 \frac{\partial^2 u}{\partial x^2} = \lambda \quad (1)$$

where $m_f$ is the mass of fluid per length of pipe, V(=V(t)) is the longitudinal velocity of the fluid and λ is the force per length exerted on the fluid by the constraining pipe. Similarly, the motion of the pipe is described by $$m_p \frac{\partial^2 u}{\partial t^2} + EI \frac{\partial^4 u}{\partial x^4} = -\lambda \quad (2)$$

where $m_p$ is the mass per length of the pipe and E and I are respectively the Young's Modulus and the second moment of area of the pipe cross-section.

Eliminating λ between equations (1) and (2) gives the equation of motion of the combined system $$(m_p + m_f) \frac{\partial^2 u}{\partial t^2} + EI \frac{\partial^4 u}{\partial x^4} + m_f \left[ 2V \frac{\partial^2 u}{\partial x \partial t} + \frac{dV}{dt} \frac{\partial u}{\partial x} + V^2 \frac{\partial^2 u}{\partial x^2} \right] = 0 \quad (3)$$

For a meter of length x the boundary conditions with respect to x are u(0,t)=u(L,t)=0 and ∂u(0,t)/∂x=∂u(L,t)/∂x=0

Equation (3) assumes the neglect of for example, axial tensions. When such terms are included, the term $$m_f \frac{dV}{dt} \frac{\partial u}{\partial x}$$

in equation (3) should be replaced by $$m_f \frac{dV}{dt} (L-x) \frac{\partial^2 u}{\partial x^2}$$

Either term may be useful in estimating the (small) step response of the meter. In either case, in equation (3), the first two terms may have a dominant influence on the solution. Thus it is reasonable to assume a solution of the form $$u(x,t) = \sum_{n=1}^{\infty} W_n(x) q_n(t)$$

where the $W_n(x)$ are the mode shapes, obtained from the solution to the equation formed by setting the first two terms in equation (3) equal to zero, and the $q_n(t)$ are usually referred to as generalized coordinates. It may not be necessary to continue the summation beyond the first two or three terms.

For the present boundary conditions, the mode shapes are given by $W_n(x) = \sin h(\beta_n x) - \sin(\beta_n x) + \alpha_n[\cos h(\beta_n x) - \cos(\beta_n x)]$, Where $\alpha_n = [\sin h(\beta_n L) - \sin(\beta_n L)]/[\cos(\beta_n L) - \cos h(\beta_n L)]$ and the $\beta_n L$ are the solutions to $\cos(\beta_n L)\cos h(\beta_n L) = 1$. For the case of V=0 the generalised coordinates are given by $q_n(t) = \sin(\omega_n t)$, where $\omega_n = (\beta_n L)^2 [EI/L^4 (m_p + m_f)]^{1/2}$. When the assumed form of solution is substituted into equation (3), after some re-arrangement, the equation can be written as $$0 = \sum_{n=1}^{\infty} \omega_n^2 W_n(x) q_n(t) + \sum_{n=1}^{\infty} W_n(x) \frac{d^2 q_n(t)}{dt^2} + \quad (5)$$

-continued $$\frac{m_f}{(m_p+m_f)}\left(2V\sum_{n=1}^{\infty}\frac{dW_n(x)}{dx}\frac{dq_n(t)}{dt}+\frac{dV}{dt}\sum_{n=1}^{\infty}\frac{dW_n(x)}{dx}q_n(t)+V^2\sum_{n=1}^{\infty}\frac{d^2W_n(x)}{dx^2}q_n(t)\right)$$

or, if the alternate form of equation (3) is used as described above:

$$0=\sum_{n=1}^{\infty}\omega_n^2 W_n(x)q_n(t)+\sum_{n=1}^{\infty}W_n(x)\frac{d^2q_n(t)}{dt^2}+ \quad (5a)$$

$$\frac{m_f}{(m_p+m_f)}\left(2V\sum_{n=1}^{\infty}\frac{dW_n(x)}{dx}\frac{dq_n(t)}{dt}+\frac{dV}{dt}(L-x)\sum_{n=1}^{\infty}\frac{dW_n^2(x)}{dx^2}q_n(t)+V^2\sum_{n=1}^{\infty}\frac{d^2W_n(x)}{dx^2}q_n(t)\right)$$

Multiplying equation (5) (or (5a)) through by the general mode shape $W_m(x)$, integrating with respect to x from x=0 to x=L and imposing the condition of orthogonality of normal modes gives, for mode m $$0=\frac{\partial^2 q_m(t)}{\partial t^2}+\omega_m^2 q_m(t)+\frac{m_f}{(m_p+m_f)}\frac{1}{\int_0^L W_m^2(x)dx} \quad (6)$$

$$\left[2V\sum_{n=1}^{\infty}\left\{\frac{dq_n(t)}{dt}\int_0^L W_m(x)\frac{dW_n(x)}{dx}dx\right\}+\frac{dV}{dt}\sum_{n=1}^{\infty}\left\{q_n(t)\int_0^L W_m(x)\frac{dW_n(x)}{dx}dx\right\}+V^2\sum_{n=1}^{\infty}\left\{q_n(t)\int_0^L W_m(x)\frac{d^2W_n(x)}{dx^2}dx\right\}\right]$$

or, if the alternate form of equation (3) is used as described above:

$$0=\frac{\partial^2 q_m(t)}{\partial t^2}+\omega_m^2 q_m(t)+\frac{m_f}{(m_p+m_f)}\frac{1}{\int_0^L W_m^2(x)dx} \quad (6a)$$

$$\left[2V\sum_{n=1}^{\infty}\left\{\frac{dq_n(t)}{dt}\int_0^L W_m(x)\frac{dW_n(x)}{dx}dx\right\}+\frac{dV}{dt}\sum_{n=1}^{\infty}\left\{q_n(t)\int_0^L W_m(x)(L-x)\frac{d^2W_n(x)}{dx^2}dx\right\}+V^2\sum_{n=1}^{\infty}\left\{q_n(t)\int_0^L W_m(x)\frac{d^2W_n(x)}{dx^2}dx\right\}\right]$$

Equation (6) (or (6a)) describes an infinite set of coupled equations for the generalized coordinates. The following coefficients can be defined in terms of the mode shape integrals, which appear in these equations:

$$\theta_m=\frac{1}{L}\int_0^L W_m^2(x)dx$$

$$\psi_{m,n}=\int_0^L W_m(x)\frac{dW_n(x)}{dx}dx$$

$$\chi_{m,n}=L\int_0^L W_m(x)\frac{d^2W_n(x)}{dx^2}dx$$

$$\sigma_{m,n}=\int_0^L xW_m(x)\frac{dW_n(x)}{dx}dx$$

These coefficients have been evaluated up to m=n=6. Values of $\theta_m$, $\psi_{m,n}$ and $\chi_{m,n}$ may be determined, and, as may be seen below, only the values of $\sigma_{2,1}$ and $\sigma_{2,2}$ (0.0006 and −22.9893) are discussed herein. A full table of values of $\sigma_{m,n}$ is available or may be determined. A good approximation may be obtained by considering only the first two modes of the series. Introducing this approximation, equation (6) yields the following pair of equations for the generalized coordinates $q_1$, and $q_2$ (in which the explicit designation of the dependent variable has been dropped and terms, which are identically zero, have been omitted:

$$\frac{d^2q_1}{dt^2}+\omega_1^2 q_1+ \quad (7)$$

$$\frac{m_f}{L\theta_1(m_p+m_f)}\left[2\psi_{1,2}V\frac{dq_2}{dt}+\psi_{1,2}\frac{dV}{dt}q_2+\frac{V^2}{L}\chi_{1,1}q_1\right]=0$$

$$\frac{d^2q_2}{dt^2}+\omega_2^2 q_2+ \quad (8)$$

$$\frac{m_f}{L\theta_2(m_p+m_f)}\left[2\psi_{2,1}V\frac{dq_1}{dt}+\psi_{2,1}\frac{dV}{dt}q_1+\frac{V^2}{L}\chi_{2,2}q_2\right]=0$$

or $$\frac{d^2q_2}{dt^2}+\omega_2^2 q_2+\frac{m_f}{L\theta_2(m_p+m_f)}\left[2\psi_{2,1}V\frac{dq_1}{dt}- \quad (8a)$$

$$\frac{dV}{dt}(\sigma_{2,1}q_1+(\chi_{2,2}-\sigma_{2,2})q_2)+\frac{V^2}{L}\chi_{2,2}q_2\right]=0$$

For many practical Coriolis meters, $q_2$ is between 100 and 1000 times smaller than $q_1$.

Equation (7) can be written as $$\frac{d^2q_1}{dt^2}+q_1\left[\omega_1^2+\frac{\chi_{1,1}m_f V^2}{L^2\theta_1(m_p+m_f)}\right]= \quad (9)$$

$$-\frac{\psi_{1,2}m_f}{L\theta_1(m_p+m_f)}\left[2V\frac{dq_2}{dt}+\frac{dV}{dt}q_2\right]$$

The solution to equation (9) is of the form $$q_1=C_{1,0}\sin(\gamma_1 t)+C_{1,1}\cos(\gamma_1 t)+\{\text{particular integral}\} \quad (10)$$

where $$\gamma_1=\sqrt{\omega_1^2+\frac{\chi_{1,1}m_f V^2}{L^2\theta_1(m_p+m_f)}}$$

The meter is driven at a frequency $\gamma_1$, by a feedback system and this fact, together with the fact that $q_2 \ll q_1$, suggests that equation (10) can be approximated as $$q_1=C_{1,0}\sin(\gamma_1 t) \quad (11)$$

where the origin of the time scale has been chosen so that $C_{1,1}=0$.

Before equation (11) is substituted into equations (8) and (8a) it is appropriate to examine the relative magnitudes of the coefficients of the dV/dt terms in the two equations. In equation (8) the dV/dt term could be significant relative to the V term for rapid changes of flow and the term should be retained. In equation (8a) however, both components of the coefficient of the dV/dt term are two to three orders of magnitude smaller, even for rapid changes in flow. Thus, if the alternate form of the governing equation is followed, the dV/dt term can be ignored for the present problem.

Substituting from equation (11) into equation (8), this equation can be written as $$\frac{d^2 q_2}{dt^2} + \gamma_2^2 q_1 = -\frac{C_{1,0}\psi_{2,1}m_f}{L\theta_2(m_p+m_f)}\left[2V\gamma_1\cos(\gamma_1 t) + \frac{dV}{dt}\sin(\gamma_1 t)\right] \quad (12)$$

where $$\gamma_2 = \sqrt{\omega_2^2 + \frac{\chi_{2,2}m_f V^2}{L^2\theta_2(m_p+m_f)}}$$

In the examination of the dynamic response of a Coriolis meter we need to explore the solution to equation (12) for the case of $$V = V_0 + H(t-t_0)\delta V \quad (13)$$

where $H(t-t_0)$ is the Heaviside unit function defined as $H(t-t_0)=0$ for $t<t_0$ and $H(t-t_0)=1$ for $t \geq t_0$.

The solution to equation (12) under these conditions is $$q_2 = C_{2,0}\sin(\gamma_2 t) + C_{2,1}\cos(\gamma_2 t) - \quad (14)$$

$$\frac{2\psi_{2,1}C_{1,0}\gamma_1 m_f \cos(\gamma_1 t)}{L\theta_2(m_p+m_f)(\gamma_2^2-\gamma_1^2)}(V_0 + H(t-t_0)\delta V) +$$

$$\frac{C_{1,0}m_f H(t-t_0)}{L\theta_2(m_p+m_f)(\gamma_2^2-\gamma_1^2)}$$

$$\left[\frac{\psi_{2,1}(\gamma_2+\gamma_1) + 2\psi_{2,1}\gamma_1\cos(\gamma_2 t - \gamma_2 t_0 - \gamma_1 t_0)}{\gamma_2(\gamma_2+\gamma_1)} - \right.$$

$$\left.\frac{\psi_{2,1}(\gamma_2-\gamma_1) - 2\psi_{2,1}\gamma_1\cos(\gamma_2 t - \gamma_2 t_0 + \gamma_1 t_0)}{\gamma_2(\gamma_2-\gamma_1)}\right]$$

In equation (14) the constants $C_{2,0}$ and $C_{2,1}$ depend on whether the meter is driven at zero flow and then the flow is switched on (at $V_0$) or the flow is started and then the meter drive is switched on.

In equation (14), in the absence of damping, the solution does not predict any delay mechanism in the response to a step change. It can also be inferred from this solution that the response to a flow impulse (period$<<1/\gamma_1$) would be merely an increase in the level of the $\gamma_2$ component in the sensor signals.

Coriolis meters may exhibit internal damping and estimates of the magnitude of that damping, expressed as a percentage of the 'critical' damping, have been obtained both from tests in which the meter drive was suddenly switched off and the decay of the tube motion was recorded, and from finite element computations of model meters. The present model of a simple straight tube meter may be revised to include the effects of damping.

With the inclusion of the effect of internal damping, there are at least two different mechanisms by which viscous (i.e. velocity dependent) damping can occur. These mechanisms may include a viscous resistance to transverse displacement and a viscous resistance to straining. However, the second of these is usually very much smaller than the first and there is relatively little information on appropriate values of the coefficient which occurs in the formulation of the mechanism. In addition, finite element simulations using, for example, the ANSYS program, normally only model the first damping mechanism. Thus only the first mechanism will be considered and this adds an extra term to equation (2), giving $$m_p\frac{\partial^2 u}{\partial t^2} + EI\frac{\partial^4 u}{\partial x^4} + c_s I\frac{\partial^5 u}{\partial x^4 \partial t} = -\lambda \quad (15)$$

where $c_s$ is the coefficient of resistance to strain velocity.

Eliminating $\lambda$ between equations (1) and (15) gives the equation of motion of the combined system including the effects of material damping, but neglecting the influence of axial forces and the alternate form of equation (3).

$$(m_p+m_f)\frac{\partial^2 u}{\partial t^2} + EI\frac{\partial^4 u}{\partial x^4} + c_s I\frac{\partial^5 u}{\partial x^4 \partial t} + \quad (16)$$

$$m_f\left[2V\frac{\partial^2 u}{\partial x \partial t} + \frac{dV}{dt}\frac{\partial u}{\partial x} + V^2\frac{\partial^2 u}{\partial x^2}\right] = 0$$

When this equation is subjected to the solution procedure used for the undamped case, the equivalent of equation (6) is $$0 = \frac{\partial^2 q_m(t)}{\partial t^2} + \omega_m^2 q_m(t) + \omega_m^2 \frac{c_s}{E}\frac{dq_m}{dt} + \quad (17)$$

$$\frac{m_f}{(m_p+m_f)}\frac{1}{\int_0^L W_m^2(x)dx}$$

$$\left[2V\sum_{n=1}^{\infty}\left\{\frac{dq_n(t)}{dt}\int_0^L W_m(x)\frac{dW_n(x)}{dx}dx\right\} + \right.$$

$$\frac{dV}{dt}\sum_{n=1}^{\infty}\left\{q_n(t)\int_0^L W_m(x)\frac{dW_n(x)}{dx}dx\right\} +$$

$$\left.V^2\sum_{n=1}^{\infty}\left\{q_n(t)\int_0^L W_m(x)\frac{d^2 W_n(x)}{dx^2}dx\right\}\right]$$

Assuming that the expansion can be truncated after the first two modes and introducing the previously defined symbolic representations of the relevant mode shape integrals, the generalized coordinates, $q_1$ and $q_2$, can be represented by the following pair of equations $$\frac{d^2 q_1}{dt^2} + \omega_1^2 q_1 + \omega_1^2 \frac{c_s}{E}\frac{dq_1}{dt} + \quad (18)$$

$$\frac{m_f}{L\theta_1(m_p+m_f)}\left[2\psi_{1,2}V\frac{dq_2}{dt} + \psi_{1,2}\frac{dV}{dt}q_2 + \frac{V^2}{L}\chi_{1,1}q_1\right] = 0$$

-continued $$\frac{d^2 q_2}{dt^2} + \omega_2^2 q_2 + \omega_2^2 \frac{c_s}{E} \frac{dq_2}{dt} + \quad (19)$$

$$\frac{m_f}{L\theta_2(m_p + m_f)} \left[ 2\psi_{2,1} V \frac{dq_1}{dt} + \psi_{2,1} \frac{dV}{dt} q_1 + \frac{V^2}{L} \chi_{2,2} q_2 \right] = 0$$

In order to maintain consistency with the solution for the undamped case, equation (18) can be re-written as $$\frac{d^2 q_1}{dt^2} + \gamma_1^2 q_1 + \gamma_1^2 \frac{c_s}{E} \frac{dq_1}{dt} + \quad (20)$$

$$\frac{m_f}{L\theta_1(m_p + m_f)} \left[ 2\psi_{1,2} V \frac{dq_2}{dt} + \psi_{1,2} \frac{dV}{dt} q_2 \right] = 0$$

where, as before $$\gamma_1 = \sqrt{\omega_1^2 + \frac{\chi_{1,1} m_f V^2}{L^2 \theta_1 (m_p + m_f)}}$$

and the $\omega_1^2$ in the third term has been replaced by $\gamma_1^2$ because the difference between $\omega_1$ and $\gamma_1$ is small and the third term is small compared to the other terms in the equation.

The fact that the meter is driven at a frequency $\gamma_1$, via a feedback system, together with the fact that $q_2 \ll q_1$, suggests that the solution to equation (20) can be approximated as $$q_1 = C_{1,0} \sin(\gamma_1 t) \quad (21)$$

where the origin of the time scale has been chosen so that $C_{1,1} = 0$.

Substituting from equation (21) into equation (19) gives $$\frac{d^2 q_2}{dt^2} + \gamma_2^2 q_2 + \omega_2^2 \frac{c_s}{E} \frac{dq_2}{dt} = -\frac{C_{1,0} \psi_{2,1} m_f}{L\theta_2(m_p + m_f)} \quad (22)$$

$$\left[ 2V \gamma_1 \cos(\gamma_1 t) + \frac{dV}{dt} \sin(\gamma_1 t) \right]$$

where, as before, $\gamma_2$ is defined by $$\gamma_2 = \sqrt{\omega_2^2 + \frac{\chi_{2,2} m_f V^2}{L^2 \theta_2 (m_p + m_f)}}$$

Substitution of typical values into equation (22) suggests that the difference between $\omega_2$ and $\gamma_2$ is less than 0.1% of their value so that we may replace the $\omega_2^2$ in the third term by $\gamma_2^2$.

In order to simplify the discussion of the solution of equation (22) under the influence of rapid flow transients it is convenient to define $$K_2 = \frac{C_{1,0} \psi_{2,1} m_f}{L\theta_2(m_p + m_f)}$$

so that equation (22) can be written as $$\frac{d^2 q_2}{dt^2} + \omega_2^2 \frac{c_s}{E} \frac{dq_2}{dt} + \gamma_2^2 q_2 = -K_2 \left[ 2V\gamma_1 \cos(\gamma_1 t) + \frac{dV}{dt} \sin(\gamma_1 t) \right] \quad (23)$$

The available experimental data on the magnitude of the material damping are largely expressed in terms of the ratio, $\alpha_1$, of the actual damping to the critical damping for the first mode motion. From equation (20) it can be seen that the critical damping is obtained for the first mode motion when $c_s = 2E/\gamma_1$ so that in general $c_s = 2\alpha_1 E/\gamma_1$. Substituting into equation (23) gives $$\frac{d^2 q_2}{dt^2} + 2\alpha_2 \gamma_2 \frac{dq_2}{dt} + \gamma_2^2 q_2 = -K_2 \left[ 2V\gamma_1 \cos(\gamma_1 t) + \frac{dV}{dt} \sin(\gamma_1 t) \right] \quad (24)$$

where $\alpha_2$ is the damping ratio for the second mode motion, defined by $\alpha_2 = \alpha_1 \gamma_2/\gamma_1$.

Before examining the effect of a step change in the flow rate it is of interest to examine the influence of material damping on the normal behaviour of the meter. While it is possible to obtain an exact solution to equation (24), it may be more convenient to make an approximation on the basis of typical values of $\alpha_2$, $\gamma_2$ and $\gamma_1$. The term $\alpha_1$, may typically be between $4.5 \times 10^{-3}$ and $3 \times 10^{-4}$. For the range of commercial meters tested, $\gamma_2$ is between $10^3$ and $1.4 \times 10^4$ and $\gamma_2$ for the simple straight tube meter is also within this range (typical values of $\gamma_1$ range between $5 \times 10^2$ and $5 \times 10^3$). The solution to equation (24) may be made easier if written as $$\frac{d^2 q_2}{dt^2} + 2\alpha_2 \gamma_2 \frac{dq_2}{dt} + \gamma_2^2 (1 + \alpha_2^2) q_2 = \quad (25)$$

$$-K_2 \left[ 2V\gamma_1 \cos(\gamma_1 t) + \frac{dV}{dt} \sin(\gamma_1 t) \right]$$

and the error introduced by the additional term is ignored as negligible.

For a steady flow velocity, V, the solution to equation (25) is given by $$q_2 = e^{-\alpha_2 \gamma_2 t} [C_{2,0} \sin(\gamma_2 t) + C_{2,1} \cos(\gamma_2 t)] - \quad (26)$$

$$2V\gamma_1 K_2 \frac{2\alpha_2 \gamma_2 \gamma_1 \sin(\gamma_1 t) + (\gamma_2^2 + \alpha_2^2 \gamma_2^2 - \gamma_1^2)\cos(\gamma_1 t)}{(1+\alpha_2^2)^2 \gamma_2^4 + 2(\alpha_2^2 - 1)\gamma_2^2 \gamma_1^2 + \gamma_1^4}$$

On the basis of the typical values of $\alpha_2$, $\gamma_2$ and $\gamma_1$ noted above, this can be further approximated to $$q_2 = e^{-\alpha_2 \gamma_2 t} [C_{2,0} \sin(\gamma_2 t) + C_{2,1} \cos(\gamma_2 t)] - \frac{2V\gamma_1 K_2}{(\gamma_2^2 - \gamma_1^2)} \cos(\gamma_1 t) \quad (27)$$

and, to a high degree of approximation, the only effect of the damping on the steady flow performance of a meter is to cause the terms in $\sin(\gamma_1 t)$ and $\cos(\gamma_1 t)$, which arise from the initial conditions, to decay (the damping may increase the power input required to drive the meter). This behaviour is in agreement with the results of finite element simulations of steady flow through meters with damping.

Returning to the problem of the step response of a meter with damping, the approximation made to the last term on the l.h.s. of equation (24) may be retained, and the solution to equation (25) for the case where $V(t)=V_0+H(t-t_0)\delta V$ may be found.

The solution now is $$q_2 = e^{-\alpha_2 \gamma_2 t}[C_{2,0}\sin(\gamma_2 t) + C_{2,1}\cos(\gamma_2 t)] - \quad (28)$$

$$2[V_0 + H(t-t_0)\delta V]\gamma_1 K_2 \frac{2\alpha_2\gamma_2\gamma_1\sin(\gamma_1 t) + (\gamma_2^2 + \alpha_2^2\gamma_2^2 - \gamma_1^2)\cos(\gamma_1 t)}{(1+\alpha_2^2)^2\gamma_2^4 + 2(\alpha_2^2-1)\gamma_2^2\gamma_1^2 + \gamma_1^4} -$$

$$\frac{2H(t-t_0)\delta V \gamma_1 K_2 e^{-\alpha_2\gamma_2(t-t_0)}}{(1+\alpha_2^2)^2\gamma_2^4 + 2(\alpha_2^2-1)\gamma_2^2\gamma_1^2 + \gamma_1^4}[(\gamma_2^2(1+\alpha_2^2)+2\gamma_2\gamma_1+\gamma_1^2)$$

$$(\alpha_2\gamma_2\sin(\gamma_2(t-t_0)+\gamma_1 t_0) + (\gamma_2-\gamma_1)\cos(\gamma_2(t-t_0)+\gamma_1 t_0)) +$$

$$(\gamma_2^2(1+\alpha_2^2) - 2\gamma_2\gamma_1 + \gamma_1^2)(\alpha_2\gamma_2\sin(\gamma_2(t-t_0)-\gamma_1 t_0) +$$

$$(\gamma_2-\gamma_1)\cos(\gamma_2(t-t_0)-\gamma_1 t_0))]$$

Equation (28) shows that the terms on the first line represent decaying oscillations at frequency $\gamma_2$ which arise from the start-up conditions; the term on the second line is identical to that obtained in the damped steady state solution (Eqn. (26)) except that V is replaced by $V_0+H(t-t_0)\delta V$ and the remaining terms represent decaying oscillations at frequency $\gamma_2$, arising from the step. When equation (28) is simplified on the basis of the typical values of $\alpha_2$, $\gamma_2$ and $\gamma_1$ the solution becomes $$q_2 = e^{-\alpha_2\gamma_2 t}[C_{2,0}\sin(\gamma_2 t) + C_{2,1}\cos(\gamma_2 t)] - \quad (29)$$

$$\frac{2[V_0 + H(t-t_0)\delta V]\gamma_1 K_2}{(\gamma_2^2-\gamma_1^2)}\cos(\gamma_1 t) -$$

$$\frac{2H(t-t_0)\delta V \gamma_1(\gamma_2-\gamma_1)K_2 e^{-\alpha_2\gamma_2(t-t_0)}}{\gamma_2}$$

$$\left[(\cos(\gamma_2(t-t_0)+\gamma_1 t_0)) + \frac{(\gamma_2-\gamma_1)}{(\gamma_2+\gamma_1)}\cos(\gamma_2(t-t_0)-\gamma_1 t_0)\right]$$

If the alternate form of equation (3) were used, it would not have changed the characteristics of equations (28) and (29) just discussed.

The solutions show that, within the level of approximation used above, the 'Coriolis' term is not subject to any damping although the terms at the $\gamma_2$ frequency are subject to damping. The physical explanation of this result is that the 'Coriolis' term is driven by the first mode motion, which is assumed to be unaffected by damping (because of the drive). The extent to which the above result will be reproduced in real meters may be affected by the details of the feedback mechanism used to generate the drive signal.

The above analysis has been performed for the simplest possible straight tube meter, driven at its lowest natural frequency. Since a majority of commercially available meters do not have this geometry, tube geometry may be examined. The finite element models of commercial meters may be used for such an examination.

In formulating and solving the finite element treatment, the models of a number of different commercially available meters and of the method of solution may be used. The general purpose ANSYS code was used and the 3-D mass, stiffness and damping elements were based both on existing steady flow work and existing theoretical equations of motion. The detailed behaviour of the flow within the tube may have a negligibly small effect on the overall response, so the fluid may be treated as a frictionless solid mass travelling along the tube at a velocity which could vary with time. This time dependence may be imposed by using, for example, the "element birth and death" feature of ANSYS.

The meters modelled may include a straight single tube meter and three twin tube meters which are referred to as the α-tube meter, the Ω-tube meter and the B-tube meter. For all four meters the physical dimensions of the tube and the material properties were supplied by the respective meter manufacturer. The models did not include any additional components which may be attached to specific points on the tubes of the commercial meters. The straight tube meter was only partially based on a commercial meter and was configured to enable a direct comparison between the finite element predictions and the analytical predictions. The accuracy of the finite element modelling was demonstrated by very close agreement between the predicted resonant mode frequencies and those determined experimentally.

The computations of the step response were based on a "standard" flow rate of 2.62 kg/s for all of the meters. Three flow steps were considered for each meter, zero flow to the standard flow, the standard flow to zero and a small step up from the standard flow. Although all the meters were nominally 25 mm, the actual internal diameters of the tubes varied from one meter to another. The flow velocities corresponding to the "standard" flow were 7.0 m/s, 4.41 m/s, 7.21 m/s and 5.44 m/s for the straight tube, the α-tube, the Ω-tube and the B-tube meters, respectively. All the transient calculations were started by imposing a pure driven motion (i.e. without any Coriolis distortion). The first stage of the calculations was performed with a high computational damping (damping ratio of 0.5% which is 10× the ANSYS default damping) and were run until the effect of the initial transients had decayed to a negligible amplitude (45 to 85 cycles of the driven motion depending on the particular meter). The output of the first stage calculation was recorded and was used to start the main transient calculation, which was performed for a number of different values of the damping ratio (including an experimentally determined value for each meter). The displacement time histories of the sensor mounting points were extracted from the main calculation and these time histories were then processed, using algorithms for processing experimental data, to give time histories of the phase difference between the two simulated sensor signals. Segments of the displacement time histories were also subjected to spectral analysis.

Figure 1D:
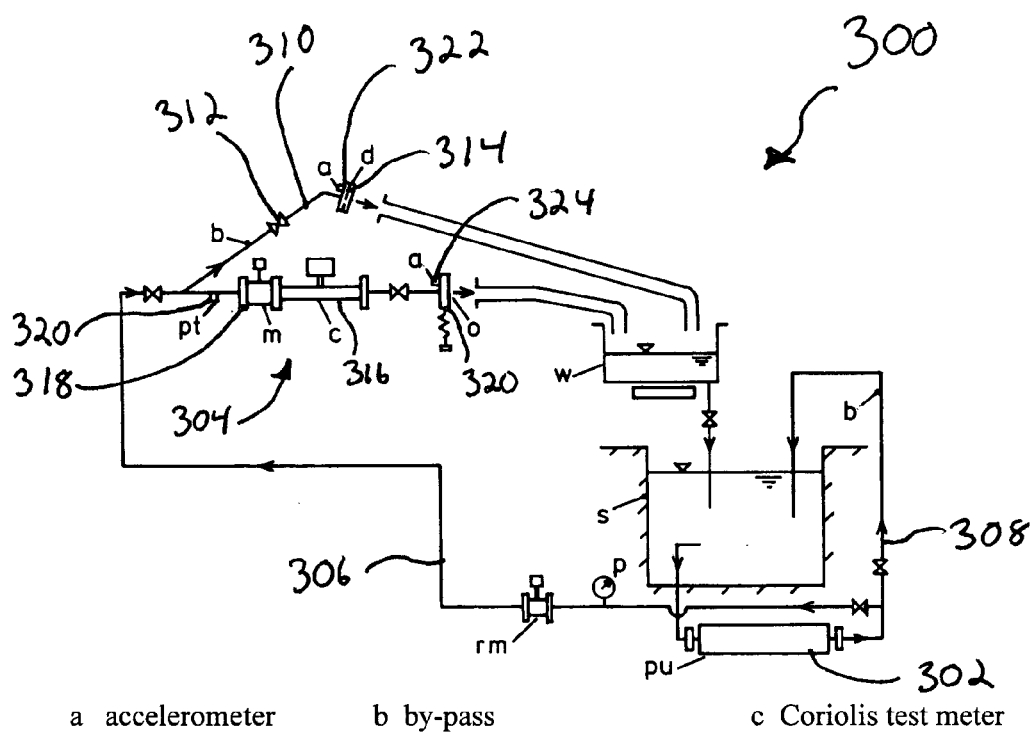
FIG. 1D is a diagram of a flow test facility.

The flow test facility 300 may be powered by a positive displacement pump 302, driven at a constant speed, which delivers a flow of 8.7 kg/s (water) at a pressure of 20 bar. The flow to the test section 304 may be delivered via a high resistance pipe section 306 and the flow rate may be controlled (in the range 0.2 kg/s to 8.7 kg/s) by bleeding off a part of the flow through bypass line 308. The steady state pressure may vary with flow rate in the range 0.2 bar to 1.1 bar. The test section 304 comprises a bypass line 310, where the flow is controlled by a valve 312 and/or a burstable diaphragm 314, and a main section where the test meter 316 is mounted between a specially modified electromagnetic flow meter 318 and a variable area orifice 320. Schematic representation of the arrangement is shown in FIG. 1D.

Two methods are provided for generating 'step' changes in flowrate. In the first, a variable area orifice plate (not shown) is moved at speed across the flow through variable area orifice 320, either increasing or decreasing the effective orifice area and hence the flow rate. This mechanism is located just downstream of the Coriolis meter 316 under test and it allows for relatively large 'step' changes in flow e.g. from 0.2 to 0.8 kg/s over intervals which can be as small as 4 ms.

However, the orifice plate device 320 generates considerable mechanical vibration while producing the step change in flow. The second method uses the sudden opening of a by-pass line 310 to produce smaller reductions in the flow rate through the meter. The sudden opening is produced by the bursting of a thin plastic diaphragm 314 covering the free end of the liquid filled by-pass. The bursting is initiated by applying a sudden discharge of electrical energy through a high resistance coil in contact with the diaphragm. This mechanism produces relatively slow 'steps' (approximately 100 ms) with very low levels of vibration.

Additional instrumentation is provided to enable characterization of the dynamic features of the flow step. A commercial electromagnetic flowmeter 318 provides a clear indication of the time history of the step. The meter is excited by a continuous dc magnetic field which gives a very good dynamic response but at the expense of a poor steady state response due to polarization effects at the sensor electrodes. A pressure transducer 320 is located just upstream of the two flowmeters 318 and 316 and accelerometers 322 and 324 are mounted adjacent to the flow step mechanisms. The accelerometer signals are arranged to have a small dc component and the first zero crossing is used to trigger the collection of data and for the synchronization between two computers used for data logging.

The first computer (not shown) logs four channels of data, namely: pressure, accelerometer signal, flow rate indicated by the electromagnetic meter 318 and the flow rate indicated by the Coriolis meter 316 under test. This latter signal is taken either from the current output or the frequency output depending on the advice of the meter manufacturer as to which they expect to give the cleanest, fastest response. The sampling rate on this first computer is typically 51.2 kHz for a 5 s record. The second computer (not shown) logs the two sensor signals from the test meter 316 at a sampling rate of 500 kHz for a 1.95 s record. The logging programs and the subsequent off-line processing are performed using, for example, the LABVIEW system, with the two sensor signals yielding an independent time history of the phase difference.

In general the two sensor signals contain components at a number of different frequencies, although the dominant component is that at the meter drive frequency. However, only the phase difference between the drive frequency components of the signals may be proportional to the mass flow rate. The computation of the phase difference between the signals can be made over a period of time which corresponds to an integer number of cycles of the drive frequency, assuming that a computation over any other period would require an a priori knowledge of the shape of the signal waveform at that frequency.

Such a knowledge may not be available and may be flowrate dependent. Thus the shortest period over which an estimate of the phase difference may generally be made is one drive cycle, and this imposes a lower limit on the effective response time of a meter. In some implementations, estimates may be obtained at a rate greater than is implied by this limit, if the estimates, each taken over a period of one drive cycle, use overlapping periods. Such estimates may not be independent and the lower limit on the meter response time remains the period of one drive cycle. Although there may be circumstances where more closely spaced estimates are desirable, all the time histories of the phase difference herein are based on non-overlapping periods.

Signal processing algorithms were developed primarily to investigate the dynamic response of meter flow tubes. This was achieved by processing independently, either signals logged directly from flow tube sensors or simulated signals obtained from analytical and finite element studies. In order not to distort the information on the response, no filtering was used.

For the purpose of comparing the analytical predictions with the finite element predictions, for the simple straight tube meter, the analytical predictions of the sensor signals were evaluated to give time histories equivalent to those obtained from the finite element simulations. In the evaluation it was assumed that to was large so that the oscillations arising from the start-up conditions had completely decayed before the step was initiated. The analytical and finite element data streams were then subjected to identical processing to yield the time histories of the phase difference, using algorithms for processing data obtained from the experiments discussed above.

In order to facilitate comparisons between the analytical and finite element predictions, and experimental data, for different meters, the results are all expressed in terms of mass flow rates, assuming that there is a linear relationship between phase difference and mass flow rate. For the analytical and finite element data the empirical coefficient defining this linear relationship was determined from the mass flow rate used in the generation of the data during a period of steady flow and the mean phase difference obtained over that period. For the simple straight tube meter the coefficients derived from the analytical and the finite element results agreed within better than 1%. The experimental tests on each different meter included calibration tests at three different flow rates and the calibration coefficients were determined from the results of these tests.

Figure 2A:
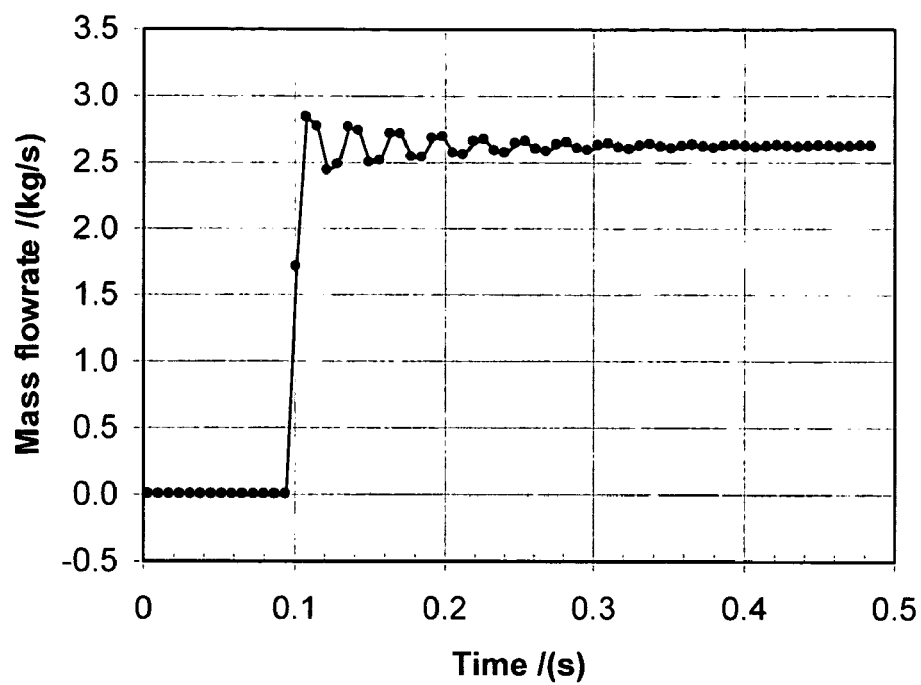
FIG. 2 is a graph showing a flow step from zero to 2.52 kg/s, damping 0.15%, with FIG. 2A showing an analytical prediction and FIG. 2B showing a finite element prediction.
Figure 2B:
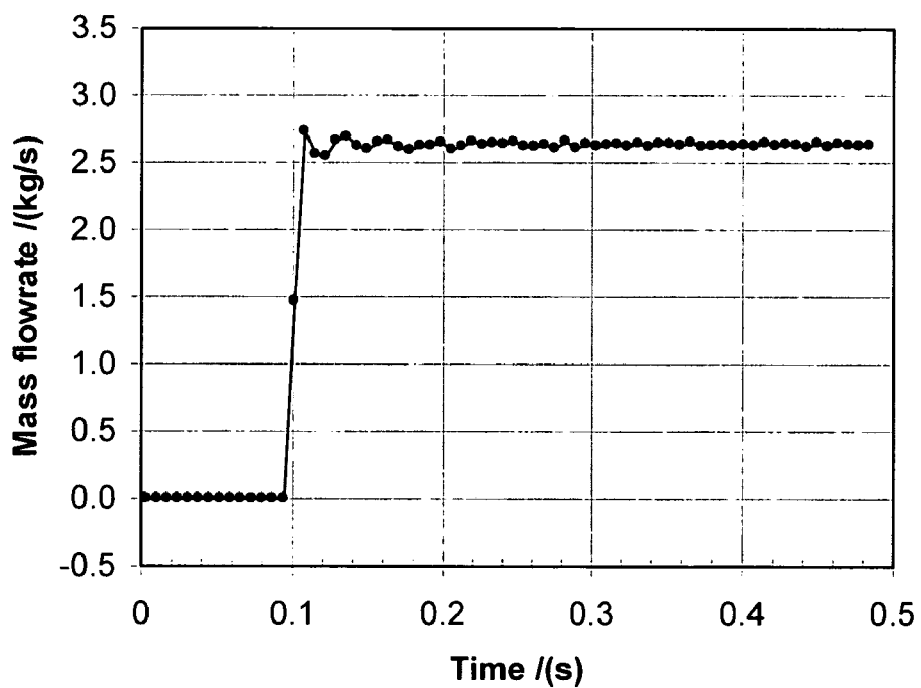

FIGS. 2A and 2B show a comparison of the response to a step as predicted by the analysis and the finite element simulation, respectively, using in both cases the experimentally determined value of the damping factor (0.15%). It should be noted that the analytical step is instantaneous, as given by the Heaviside step function where as the finite element step occurs over one calculation time step (50 µs). The two predictions of the phase difference (mass flow rate) show good agreement with respect to the decay rate, with the analytical prediction showing a larger initial amplitude of fluctuation as might be expected from the above noted difference in the detailed representation of the steps.

Figure 3A:
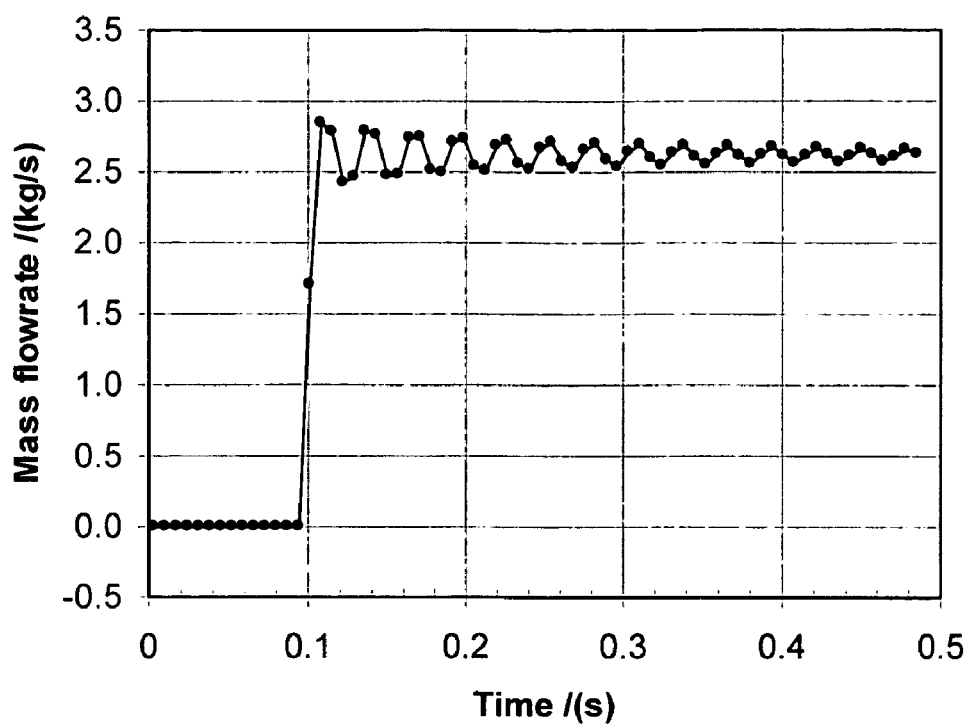
FIGS. 3A and 3B are graphs showing the effect of changing the damping, theoretical prediction, with FIG. 3A showing damping of 0.05% and FIG. 3B showing damping of 0.45%.
Figure 3B:
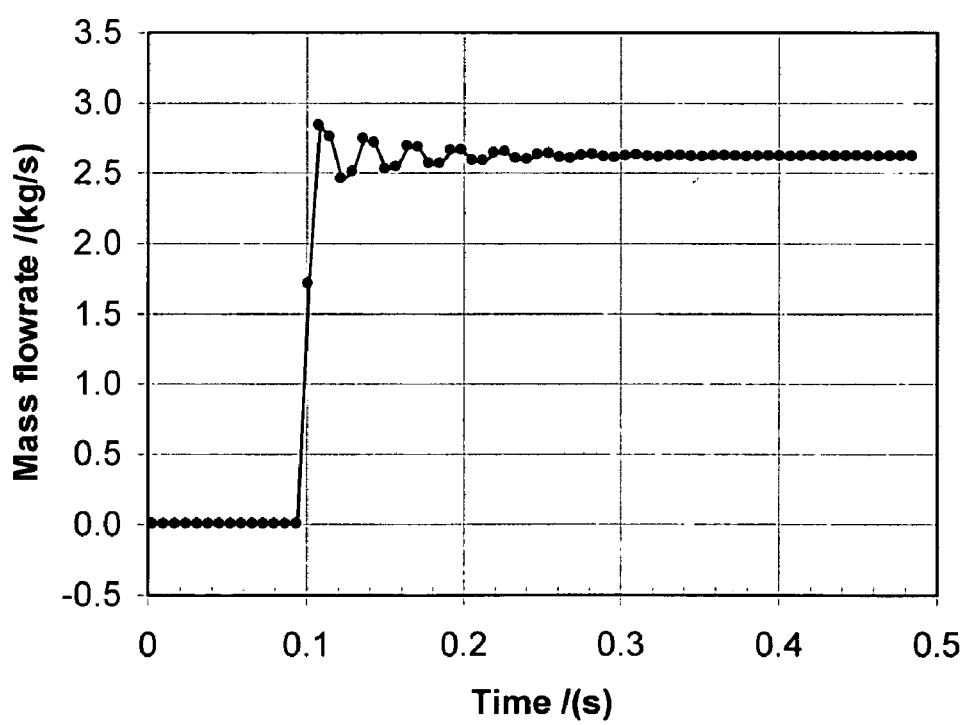

FIGS. 3A and 3B show the effect on the response of increasing the damping. The data were obtained from the analytical solution but the trends would have been the same if the data had been taken from finite element simulations of the straight tube meter. FIG. 3(*a*) uses data evaluated for a damping ratio of 0.05% (i.e. 3 times smaller than that used in FIG. 2(*a*)) and FIG. 3(*b*) uses data for a damping ratio of 0.45% (i.e. 3 times larger).

Figure 4:
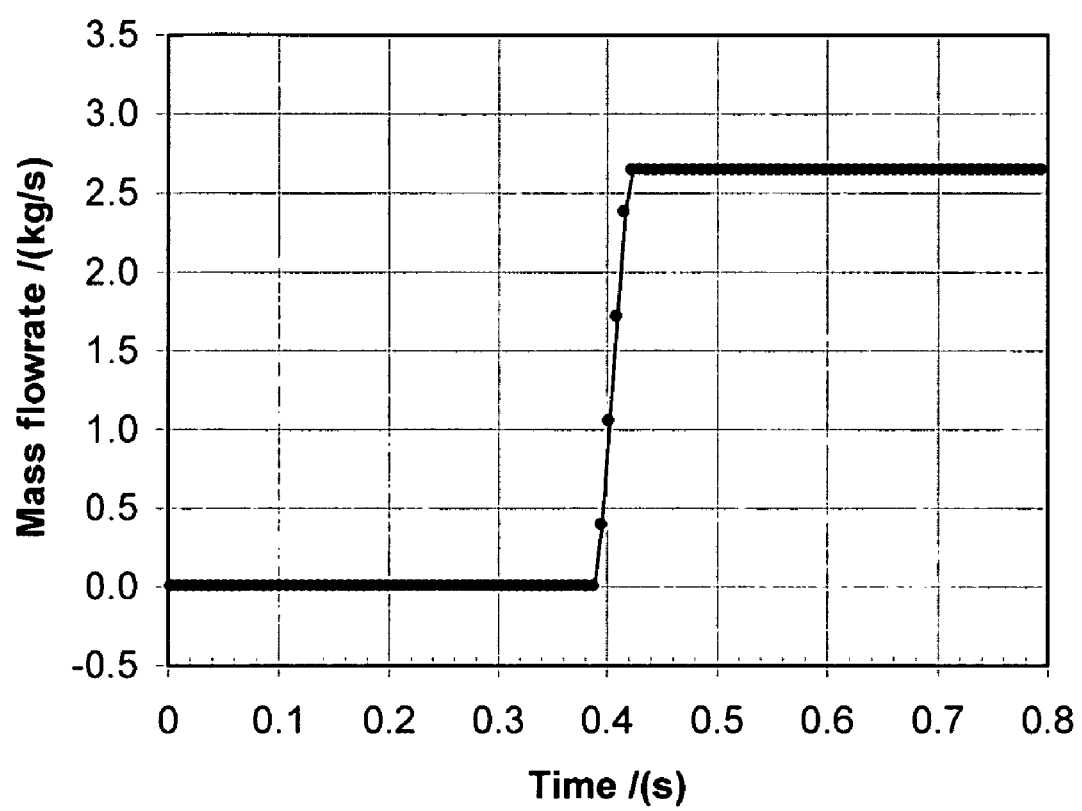
FIG. 4 is a graph showing a response to a 'slow' step, finite element prediction, with damping of 0.15%

An analytical solution for a slower step is not discussed in detail. The finite element simulation may be repeated for a step occurring linearly over a period equal to four cycles of the meter drive. FIG. 4 shows the result of the finite element simulation (damping ratio 0.15%) and this may be compared to the simulation of a fast step shown in FIG. 2(b). In this example, no 'noise' is apparent on the time history of the phase difference (mass flow rate).

Figure 5A:
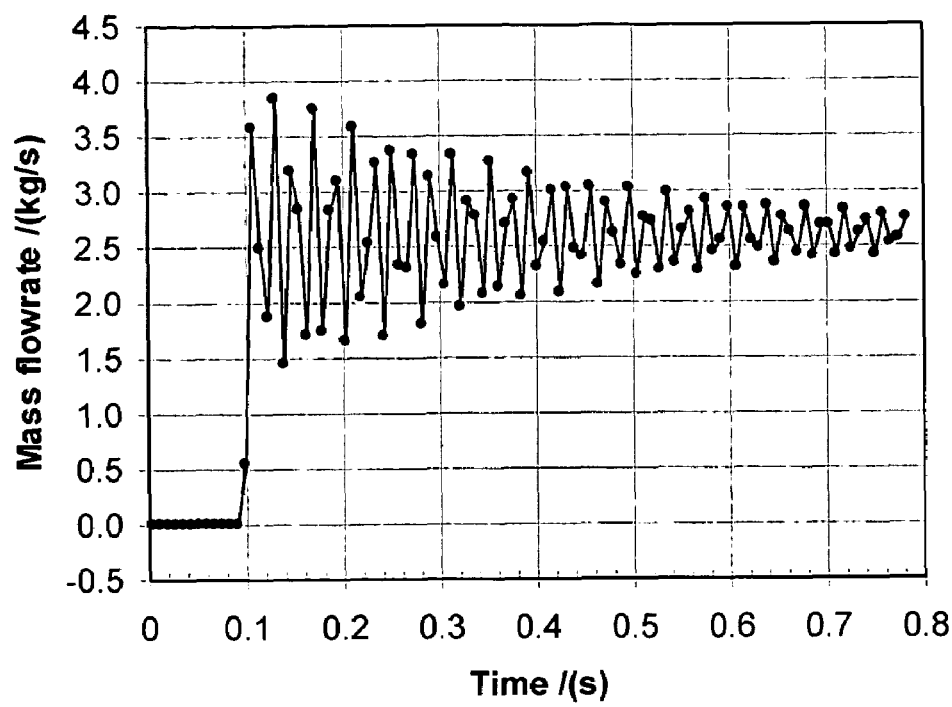
FIGS. 5A and 5B are graphs showing finite element predictions of response to a fast step, with FIG. 5A showing α-tube meter, with experimentally determined damping, and FIG. 5B showing Ω-tube meter, with experimentally determined damping
Figure 5B:
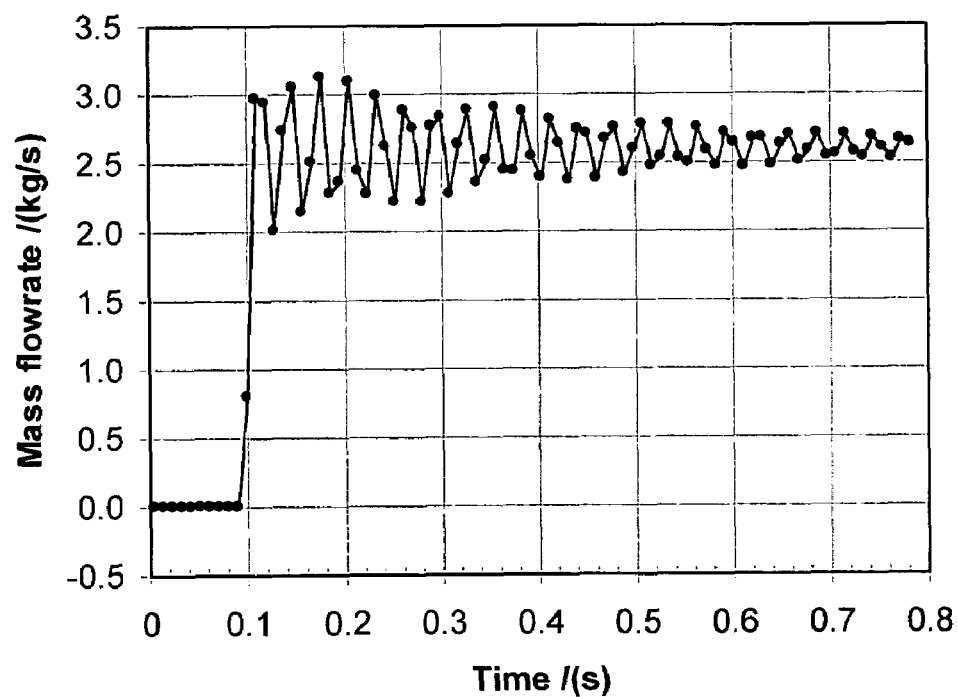

FIGS. 5A and 5B show the finite element predictions for the responses of the α-tube and the Ω-tube meters, respectively, to a 'fast' step (one finite element calculation time step), using in each case the experimentally determined damping factor. In this example, the nature of the response is not significantly affected by the meter geometry.

Figure 6A:
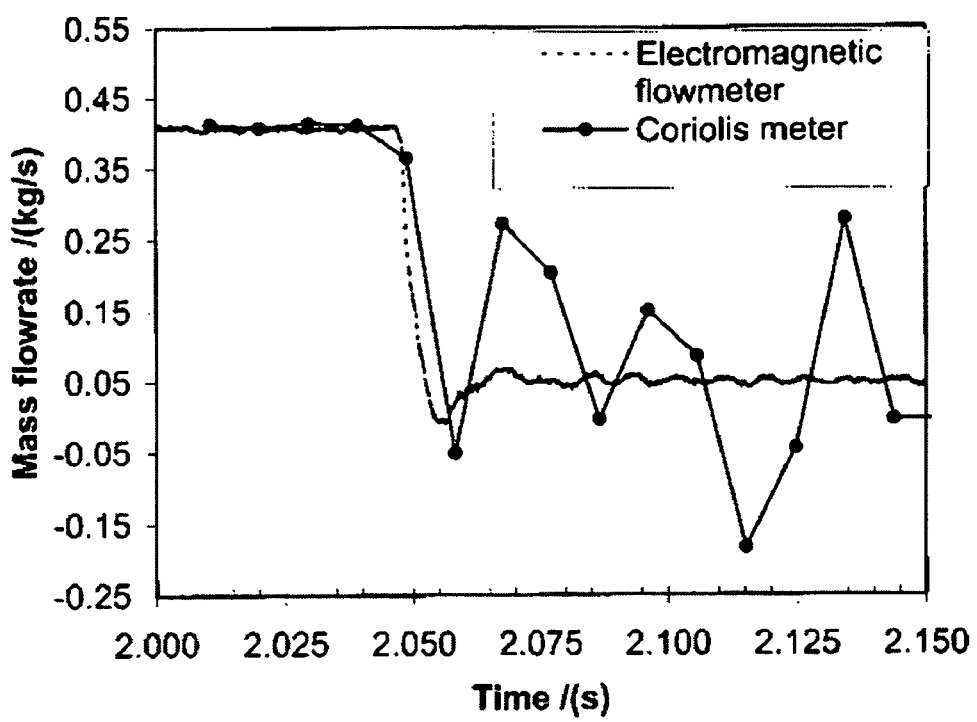
FIGS. 6A and 6B are graphs showing measured response to a fast step (5 ms), with FIG. 6A showing a meter having a drive frequency of about 100 Hz, and FIG. 6B showing a meter having a drive frequency of about 800 Hz
Figure 6B:
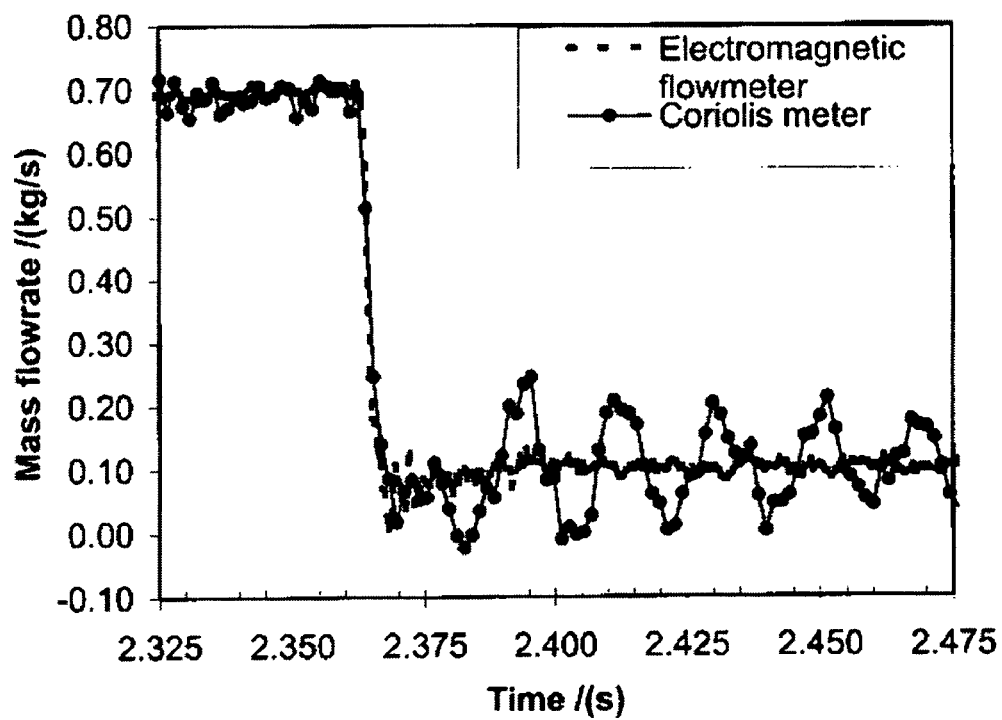

The analytical and finite element predictions can be compared with experimental measurements of the response made on a range of commercial meters. FIGS. 6A and 6B show two examples of meter response to a fast step (5 ms duration). The data presented in FIG. 6A were obtained with a meter having a relatively low drive frequency (in the region of 100 Hz) while those in FIG. 6B were obtained with a meter having a much higher drive frequency(in the region of 800 Hz).

The respective spacing of the Coriolis meter data in the two figures reflects the fact that one estimate of the phase difference (and hence of the flow rate) may be obtained for each cycle of the meter drive. With the lower frequency meter the step is completed within less than one drive cycle, but with the higher frequency meter it extends over approximately three drive cycles. For both meters the noise level after the step is significantly greater than would have been predicted by a finite element simulation of a step of the same speed. This was due to the mechanical vibrations caused by the operation of the variable area orifice device, which was confirmed by examination of the time history of the signal from an accelerometer attached to the apparatus.

Figure 7:
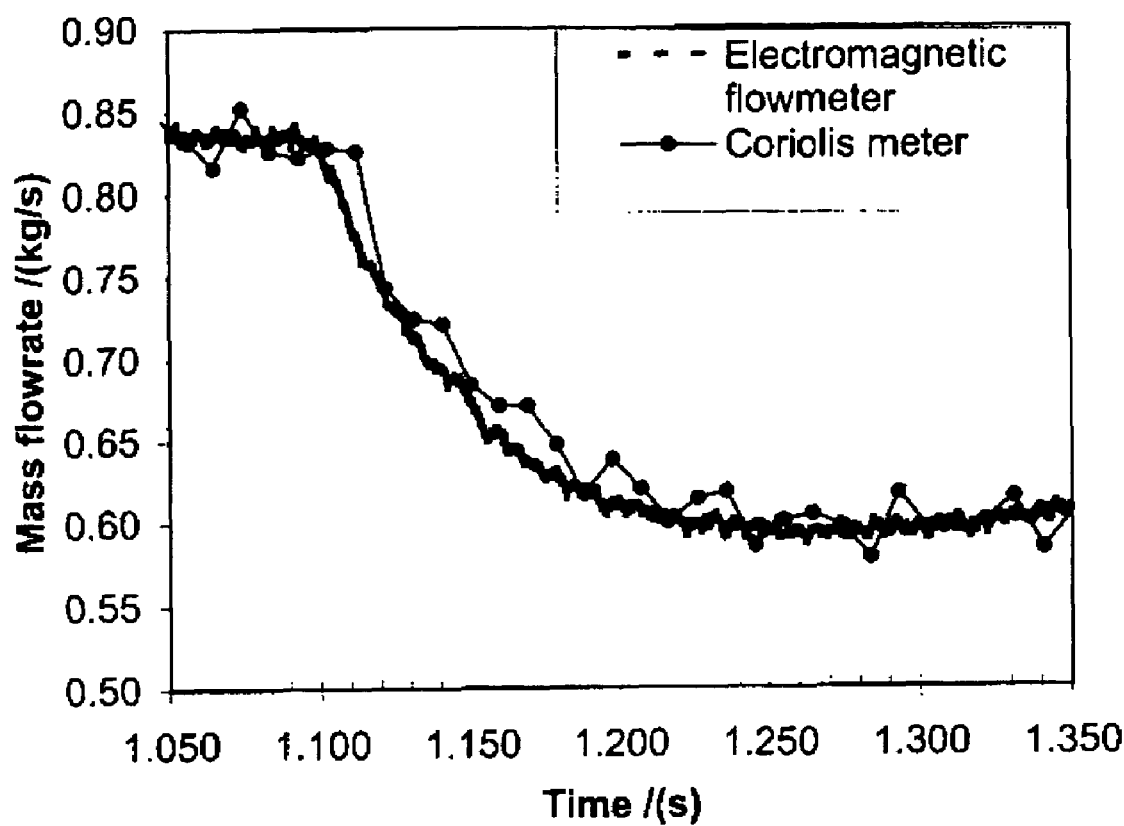
FIG. 7 is a graph showing measured response to a slow step (approx. 100 ms) meter having a drive frequency of approximately 100 Hz

The significance of any vibration introduced by the mechanism used for the creation of a step is further emphasised in FIG. 7 which shows the response of a meter to slow step initiated by the bursting of a diaphragm. This mechanism produces no significant mechanical vibration and the response shows no significant increase in the noise level on the Coriolis meter output signal, after the step.

The data presented in FIGS. 2, 3 and 4 are only a part of the results derived from the analysis and the finite element modelling for the simple straight tube meter. Over the totality of the results, the agreement between the predictions of the two approaches is very good. A comparison of FIGS. 3A and 3B, together with FIG. 2A shows that increasing the damping affects the rate of decay of the fluctuations in the computed flow rate. These fluctuations which appear to be at frequencies in the range of 40 Hz to 60 Hz actually arise from the sensor signal components at the Coriolis frequency which are generated by the step. In the calculation of the phase difference at the drive frequency (between the simulated sensor signals), the Coriolis frequency component generates a beat with a frequency equal to the difference between the Coriolis frequency and the drive frequency. This frequency is much greater than the frequency at which the phase difference data are generated (i.e. the drive frequency), and so aliasing occurs, giving the impression of a lower frequency. The calculation time step used in the finite element simulation was sufficiently small for the simulated sensor signals to have shown a component at the next highest mode frequency if one had been present. Spectra of the simulated sensor signals immediately after the step, clearly show the component at the Coriolis frequency but they do not show anything at the next higher mode frequency. This provides an additional justification of the decision to truncate the analytical solution after the second mode.

For the complex geometry meters, the distribution of the modal frequencies was more complicated and for at least one of the meters, the finite element simulation showed indications that the step may generate components at frequencies other than the Coriolis frequency. However, these components were very much smaller than those at the Coriolis frequency.

In assessing the results discussed herein, the signal processing algorithms discussed above generally deal with investigation of the dynamic response of meter flow tubes. The signals logged may be processed independently directly from the flow tube sensors. In order to preserve the information available within the phase difference data, no filtering was used. Further, because these data were all post-processed, the computational time required to produce the phase difference estimates was not an issue.

The signal processing requirements for the user-output of a commercial meter are significantly different from those specified above. In particular, filtering may be used to remove signal noise and the computational time required for on-line processing is a significant issue. Also, it is common for blocks of data from several (or many) drive cycles to be used in the estimation of the phase difference. In general, the differences observed between the user-output response to a fast flow step and the flow tube responses reported herein are as follows: the user-output shows a delay in the onset of the step, a lengthening of the step duration, and no fluctuations following the step.

The analytical and finite element results, together with the experimental data on the response of commercial meters to a fast step, all combine to emphasise that the time constant for the mechanical response of Coriolis meters is the period of one cycle of the drive. The very much larger time constants which are observed from the indicated output of commercial meters arise from constraints introduced by particular algorithms used for the estimation of the phase difference and from other characteristics of the signal processing. It would appear to be probable that a significant part of the increase in the time constant arises from damping introduced during the signal processing to suppress the fluctuations caused by the Coriolis frequency components in the sensor signals. It is likely that the overall design of a meter may involve a compromise between absolute accuracy (freedom from spurious fluctuations) and speed of response. For many applications the emphasis is towards a high accuracy of mean flow indication over periods of many drive cycles. The examples discussed herein establish response time limitations in such situation(s).

The time constant of a Coriolis meter is generally not less than the period of one cycle of the meter drive, assuming that this is the shortest period over which a meaningful estimate of the phase difference between the sensor signals can be made.

The response of the meter sensor signals to a step change in mass flow rate comprises two parts. That part of the signal which is at the drive frequency and is responsible for the phase difference (linearly proportional to the mass flow rate) is, to a high degree of approximation, independent of the magnitude of the internal damping. There is an additional component of the response which is predominantly at the Coriolis frequency and this part decays exponentially under the influence of the internal damping.

The effective time constant of commercial Coriolis meters is generally many times larger than the period of one drive cycle because of the particular algorithms used in the determination of the phase difference and because of additional computational damping introduced to minimise the influence of the non-drive frequency components of the sensor signals.

For changes in flow rate which occur continuously over periods which are several times larger than the period of one drive cycle the Coriolis meter has the potential to measure a true time history of the change in flow rate.

The damping characteristics of a tube may be changed (e.g., damping increased) by coating or otherwise applying a high damping material to the tube, either over the whole tube or over portions of the flowtube. In general, increasing the internal damping of the flowtube as a whole, while improving the frequency response, reduces meter sensitivity (signal per flow rate). However, by placing the high damping material on portions of the tube (rather than the whole tube), the flowtube may have different internal damping characteristics at different points along the length of the tube, and therefore may experience frequency-dependent damping.

Thus, the result of the different internal damping characteristics along the length of the tube may result in increased damping for certain modes of vibration, but not other modes. Thus, the different damping characteristics may result in increased damping at other modes besides the driven mode, without substantially increasing damping of the driven mode. This may result in an improved frequency response without a substantial reduction in meter sensitivity. The points along a tube for which the damping should be increased to damp the other modes of vibration and not the driven mode can be determined experimentally or through simulation.

Further, other manners of having frequency dependent damping may be used to increase damping at modes other than the driven mode, without substantially damping the driven mode. For example, the tube may be made from a composite material that exhibits frequency dependent damping.

A number of implementations have been described. Nevertheless, it will be understood that various modifications may be made.

What is claimed is:

1. A method comprising:
   providing a vibratable flowtube configured to receive a flow of fluid, the vibratable flowtube having internal damping characteristics that substantially result in a desired dynamic response of the vibratable flowtube, the internal damping characteristics being frequency-dependent such that damping of a driven mode of vibration is not substantially increased and damping at one or more modes other than the driven mode are substantially increased;
   connecting at least one driver to the provided vibratable flowtube such that the driver is operable to impart motion to the flowtube;
   connecting at least one sensor to the provided vibratable flowtube such that the sensor is operable to sense the motion of the flowtube and generate a sensor signal; and
   connecting at least one controller to the sensor such that the controller is operable to receive the sensor signal.

2. The method of claim 1 wherein providing the vibratable flowtube comprises providing a vibratable flowtube that has different internal damping characteristics at different points along a length of the vibratable flowtube.

3. The method of claim 2 wherein providing the vibratable flowtube that has different internal damping characteristics at different points along a length of the vibratable flowtube comprises applying a high damping material to the vibratable flowtube at the different points along the length of the tube.

4. The method of claim 1 wherein providing the vibratable flowtube comprises providing a vibratable flowtube made of a composite material that has frequency-dependent internal damping.

5. The method of claim 1 wherein the vibratable flowtube is part of a Coriolis flowmeter.

6. The method of claim 1 wherein providing the vibratable flowtube comprises providing a vibratable flowtube having internal damping characteristics that substantially result in a desired dynamic response of the vibratable flowtube to a change in a property of a flow of fluid through the vibratable flowtube.

7. The method of claim 1 wherein providing the vibratable flowtube comprises providing a vibratable flowtube having internal damping characteristics that substantially result in a desired dynamic response of the vibratable flowtube to a change in a mass flow rate of a flow of fluid through the vibratable flowtube.

8. The method of claim 1 providing the vibratable flowtube comprises providing a vibratable flowtube having internal damping characteristics that substantially result in a desired dynamic response of the vibratable flowtube to a step change in a flow of fluid through the vibratable flowtube.

9. The method of claim 1 wherein providing the vibratable flowtube comprises providing a vibratable flowtube having internal damping characteristics that substantially result in a desired dynamic response of the vibratable flowtube to a step change in a mass flow rate of a flow of fluid through the vibratable flowtube.

10. A flowmeter comprising:
    a vibratable flowtube configured to receive a flow of fluid, the vibratable flowtube having internal damping characteristics that substantially result in a desired dynamic response of the vibratable tube, the internal damping characteristics being frequency-dependent such that damping of a driven mode of vibration is not substantially increased and damping at one or more modes other than the driven mode are substantially increased;
    at least one driver connected to the flowtube and operable to impart motion to the flowtube;
    at least one sensor connected to the flowtube and operable to sense the motion of the flowtube and generate a sensor signal; and
    at least one controller configured to receive the sensor signal.

11. The flowmeter of claim 10 wherein the vibratable flowtube has internal damping characteristics that substantially result in a desired dynamic response of the vibratable flowtube to a change in a property of a flow of fluid through the vibratable flowtube.

12. The flowmeter of claim 10 wherein the vibratable flowtube has internal damping characteristics that substantially result in a desired dynamic response of the vibratable flowtube to a change in a mass flow rate of the fluid.

13. The flowmeter of claim 10 wherein the vibratable flowtube has internal damping characteristics that substantially result in a desired dynamic response of the vibratable flowtube to a step change in the flow of fluid.

14. The flowmeter of claim 10 wherein the vibratable flowtube has internal damping characteristics that substantially results in a desired dynamic response of the vibratable flowtube to a step change in a mass flow rate of the fluid.

15. The flowmeter of claim 10 wherein the flowmeter is a Coriolis flowmeter.

16. The flowmeter of claim 10 wherein the vibratable flowtube has different internal damping characteristics at different points along a length of the vibratable flowtube.

17. The flowmeter of claim 15 wherein the vibratable flowtube comprises a high damping material applied to the vibratable flowtube at the different points along the length of the tube to provide the different internal damping characteristics at the different points along the length of the vibratable flowtube.

18. The flowmeter of claim 10 wherein the vibratable flowtube is made of a composite material that has frequency-dependent internal damping.

19. The method flowmeter of claim 18 wherein the vibratable flowtube comprises a high damping material applied to the vibratable flowtube at the different points along the length of the tube to provide the frequency-dependent damping.

20. The method flowmeter of claim 18 wherein the vibratable flowtube is made of a composite material that has the frequency-dependent internal damping.

21. A flowmeter comprising:

a vibratable flowtube having frequency-dependent internal damping that results in substantial damping at one or more modes other than a driven mode without substantial damping at the driven mode;

at least one driver connected to the flowtube and operable to impart motion to the flowtube;

at least one sensor connected to the flowtube and operable to sense the motion of the flowtube and generate a sensor signal; and at least one controller configured to receive the sensor signal.

* * * * *

UNITED STATES PATENT AND TRADEMARK OFFICE
CERTIFICATE OF CORRECTION

PATENT NO. : 7,240,567 B2
APPLICATION NO. : 10/976312
DATED : July 10, 2007
INVENTOR(S) : Robert Cheesewright et al.

It is certified that error appears in the above-identified patent and that said Letters Patent is hereby corrected as shown below:

Column 21, line 15, in claim 19 delete "method".

Column 22, line 1, in claim 20 delete "method".

Signed and Sealed this

Seventeenth Day of November, 2009

David J. Kappos
*Director of the United States Patent and Trademark Office*